US010822499B2

(12) United States Patent
Yang et al.

(10) Patent No.: US 10,822,499 B2
(45) Date of Patent: Nov. 3, 2020

(54) POLYETHERIMIDE VARNISH COMPOSITIONS, METHODS OF MANUFACTURE, AND ARTICLES PREPARED THEREFROM

(71) Applicant: SABIC Global Technologies B.V., Bergen op Zoom (NL)

(72) Inventors: Jian Yang, Shanghai (CN); Liang Shen, Shanghai (CN); Liping Zheng, Shanghai (CN); Ying Na, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 215 days.

(21) Appl. No.: 15/518,043

(22) PCT Filed: Oct. 5, 2015

(86) PCT No.: PCT/IB2015/057615
§ 371 (c)(1),
(2) Date: Apr. 10, 2017

(87) PCT Pub. No.: WO2016/055926
PCT Pub. Date: Apr. 14, 2016

(65) Prior Publication Data
US 2017/0306162 A1    Oct. 26, 2017

Related U.S. Application Data

(60) Provisional application No. 62/062,238, filed on Oct. 10, 2014.

(51) Int. Cl.
*C09D 4/00* (2006.01)
*C08G 73/10* (2006.01)
(Continued)

(52) U.S. Cl.
CPC ........... *C09D 4/00* (2013.01); *C08G 73/1003* (2013.01); *C08G 73/1046* (2013.01); *C08K 3/08* (2013.01); *C09D 5/00* (2013.01); *C08K 2003/085* (2013.01)

(58) Field of Classification Search
CPC ... C09D 4/00; C09D 5/18; C09D 5/24; C09D 5/00; C09D 7/40; C08L 79/04; C08L 79/08
(Continued)

(56) References Cited

U.S. PATENT DOCUMENTS

| 4,874,835 A | 10/1989 | Berdahl |
| 4,973,630 A | 11/1990 | Leung et al. |

(Continued)

FOREIGN PATENT DOCUMENTS

| EP | 0439828 A2 | 8/1991 |
| EP | 0551747 A1 | 7/1993 |

(Continued)

OTHER PUBLICATIONS

International Search Report for International Application No. PCT/IB2015/057615, International Filing Date Oct. 5, 2015; dated Nov. 25, 2015; 6 pages.

(Continued)

*Primary Examiner* — Jane L Stanley
(74) *Attorney, Agent, or Firm* — Cantor Colburn LLP

(57) ABSTRACT

A varnish includes an isolated as-synthesized polyetherimide having a glass transition temperature of 180° C. or more, a solvent in an amount effective for the polyetherimide to remain in solution at a selected temperature, and an inorganic particulate composition wherein the amount of polyetherimide, inorganic particulate composition, and solvent total 100 wt %. Also disclosed is a method of manu- (Continued)

Viscosity of 20 wt% Ultem 1040A in various solvents facturing the varnish, articles prepared from the varnish, and methods of manufacturing such articles.

6 Claims, 6 Drawing Sheets

(51) Int. Cl.
*C08K 3/08* (2006.01)
*C09D 5/00* (2006.01)

(58) Field of Classification Search
USPC ........................................................ 523/513
See application file for complete search history.

(56) References Cited

U.S. PATENT DOCUMENTS

| | | | |
|---|---|---|---|
| 8,273,463 B2 * | 9/2012 | Tsurumi | C23C 18/2086 428/32.51 |
| 9,353,264 B2 | 5/2016 | Liu | |
| 2005/0154181 A1 | 7/2005 | Dueber et al. | |
| 2005/0165151 A1 * | 7/2005 | Fujiwara | H05K 1/0373 524/449 |
| 2006/0127686 A1 | 6/2006 | Meloni | |
| 2008/0044684 A1 * | 2/2008 | Chan | B29B 17/0042 428/626 |
| 2009/0269599 A1 * | 10/2009 | Tsurumi | C23C 18/2086 428/458 |
| 2010/0207282 A1 | 8/2010 | Uchida et al. | |
| 2012/0228542 A1 | 9/2012 | l'Abee et al. | |
| 2013/0288120 A1 | 10/2013 | Iida et al. | |
| 2014/0094535 A1 | 4/2014 | Guggenheim et al. | |
| 2014/0187674 A1 * | 7/2014 | Lee | C09J 185/02 523/435 |

FOREIGN PATENT DOCUMENTS

| | | |
|---|---|---|
| JP | S63280078 A | 11/1988 |
| JP | H02124971 A | 5/1990 |
| JP | H02229041 A | 9/1990 |
| JP | 2001323174 A | 11/2001 |
| JP | 2007138142 A | 6/2007 |
| JP | 2008094927 A | 4/2008 |
| JP | 2013071969 A | 4/2013 |
| JP | 2014156545 A | 8/2014 |
| WO | 9850211 | 11/1998 |
| WO | 2014055747 A1 | 4/2014 |
| WO | 2014100213 A3 | 6/2014 |

OTHER PUBLICATIONS

Written Opinion of the International Searching Authority for International Application No. PCT/IB2015/057615, International Filing Date: Oct. 5, 2015; dated Nov. 25, 2015; 6 pages.
Japanese Office Action translation for the corresponding Japanese Application No. 2017-518343; dated Aug. 13, 2019; 6 pages.

* cited by examiner

POLYETHERIMIDE VARNISH COMPOSITIONS, METHODS OF MANUFACTURE, AND ARTICLES PREPARED THEREFROM

CROSS REFERENCE TO RELATED APPLICATION

This application is a National Stage application of International Application No. PCT/IB2015/057615, filed Oct. 5, 2015, which claims the benefit of U.S. Provisional Application No. 62/062,238, filed Oct. 10, 2014, both of which are incorporated by reference herein in their entirety herein.

BACKGROUND

Polyetherimides (PEI) are amorphous, transparent, high performance polymers having a glass transition temperature (Tg) of greater than 180° C. Polyetherimides further have high strength, heat resistance, and modulus, and broad chemical resistance, and so are widely used in applications as diverse as automotive, telecommunication, aerospace, electrical/electronics, transportation, and healthcare.

Polyetherimides, as well as copolymers thereof, have shown versatility in various manufacturing processes, proving amenable to techniques including injection molding, extrusion, and thermoforming, to prepare various articles including layers, fibers, and composite materials.

Polyetherimides and the processing thereof has been the subject of intensive research and development, yet there remains a continuing need for new methods of manufacturing, for example with regard to applications including laminates, adhesives, coatings, and composites.

BRIEF DESCRIPTION

A varnish comprises 1 to 45 wt %, preferably 5 to 45 wt %, more preferably 10 to 40 wt %, even more preferably 15 to 35 wt % of an isolated as-synthesized polyetherimide having a glass transition temperature of 180° C. or more, a solvent in an amount effective for the polyetherimide to remain in solution at a selected temperature, 0 to 40 wt %, preferably 1 to 40 wt %, more preferably 5 to 30 wt % of an inorganic particulate composition wherein the amount of polyetherimide, inorganic particulate composition, and solvent total 100 wt %, wherein the varnish has a viscosity greater than 100 cP at 23° C., or a viscosity greater than 30 cP at 90° C.

A method of manufacturing the varnish is also disclosed, the method comprising combining the components of the varnish, and heating the components at a temperature and for a period of time effective to dissolve the polyetherimide in the solvent, preferably at a temperature lower than the boiling point of the solvent.

A method of manufacturing an article from the varnish is disclosed, the method comprising forming the article from the varnish, and removing the solvent from the formed article.

A method of preparing a copper clad laminate is described, the method comprising laminating the polyetherimide layer to a conductive metal circuit layer under heat and pressure, and optionally, subsequently or simultaneously, laminating the polyetherimide layer to a supporting metal matrix layer, wherein the supporting metal matrix layer is disposed on the polyetherimide layer on a side opposite the conductive metal circuit layer.

A method of preparing a metal core copper clad laminate is also described, the method comprising laminating a polyetherimide layer to a supporting metal matrix under heat, pressure, or a combination thereof; and subsequently or simultaneously, laminating the polyetherimide layer to a conductive metal circuit layer, wherein the conductive metal circuit layer is disposed on the polyetherimide dielectric layer on a side opposite the supporting metal matrix layer; wherein the laminate has a thermal conductivity of greater than 0.3 W/m-K.

A method of manufacturing a composite is disclosed, the method comprising impregnating a porous base material with the varnish, and removing the solvent from the impregnated porous base material, wherein the porous base material comprises a ceramic, a polymer, a glass, carbon, or a combination comprising at least one of the foregoing. A composite formed by the method and an article comprising the composite represent additional aspects of the disclosure.

A method of manufacturing a multilayer article is also disclosed, the method comprising forming a layer comprising the varnish on a substrate, removing the solvent from the layer to provide a primer layer, forming a second layer comprising a ceramic, a thermoplastic polymer, a thermosetting polymer, or a combination comprising at least one of the foregoing on the primer layer to provide the multilayer article, and optionally thermally treating the multilayer article to cure the thermosetting polymer, wherein the second layer optionally further comprises the above-described varnish, and forming the layer further comprises removing the solvent from the second layer; wherein the ceramic is $Al_2O_3$, $TiO_2$, $ZrO_2$, $Cr_2O_3$, $SiO_2$, MgO, BeO; $Y_2O_3$, $Al_2O_3$—$SiO_2$, MgO—$ZrO_2$, SiC, WC, $B_4C$, TiC, $Si_3N_4$, TiN, BN, AlN, TiB, $ZrB_2$, or a combination comprising at least one of the foregoing; the thermoplastic polymer is a fluoropolymer, more preferably polytetrafluoroethylene, tetrafluoroethylene-perfluoroalkylvinylether copolymer, tetrafluoroethylene-hexafluoropropylene copolymer, polychlorotrifluoroethylene, tetrafluoroethylene-ethylene copolymer, polyvinylidene fluoride, or a combination comprising at least one of the foregoing; and the thermosetting polymer composition is an epoxy, cyanate ester, phenolic novolac epoxy, or a combination comprising at least one of the foregoing.

The above described and other features are exemplified by the following figures and detailed description.

BRIEF DESCRIPTION OF THE DRAWINGS

The following Figures are exemplary embodiments.

DETAILED DESCRIPTION

Figure 1:
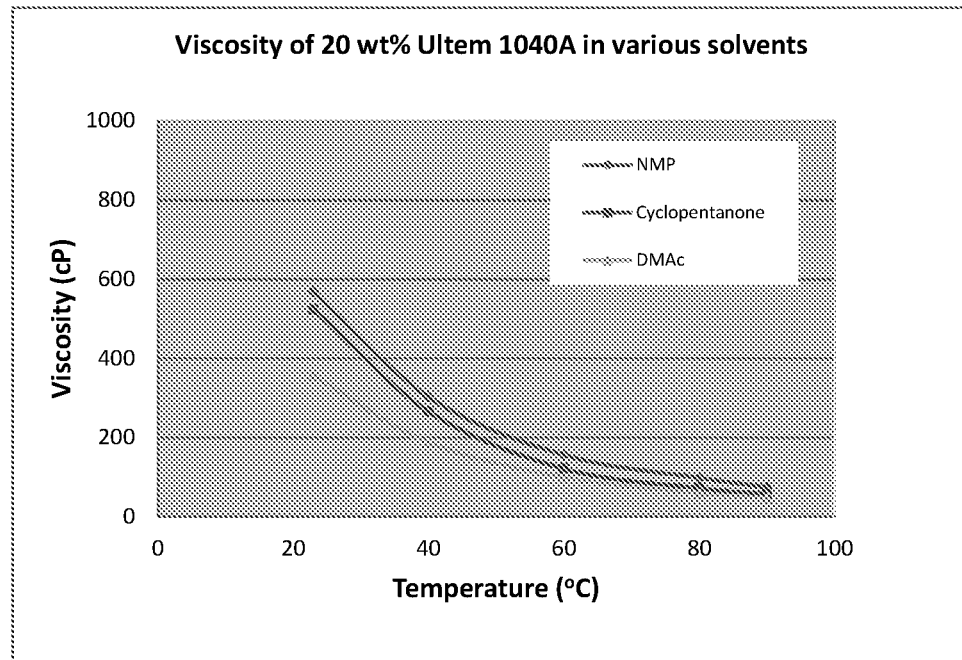
FIG. 1 shows the viscosity (centipoise, cP) of a 20 weight percent (wt %) solution of a polyetherimide comprising structural units derived from phenylene diamine and BPA-dianhydride, and having a weight average molecular weight of 23,000 g/mole (ULTEM 1040A) in N-methyl pyrrolidone (NMP) (circles), cyclopentanone (squares), and dimethyl acetamide (DMAc) (triangles) from about 20 to about 90° C.
Figure 2:
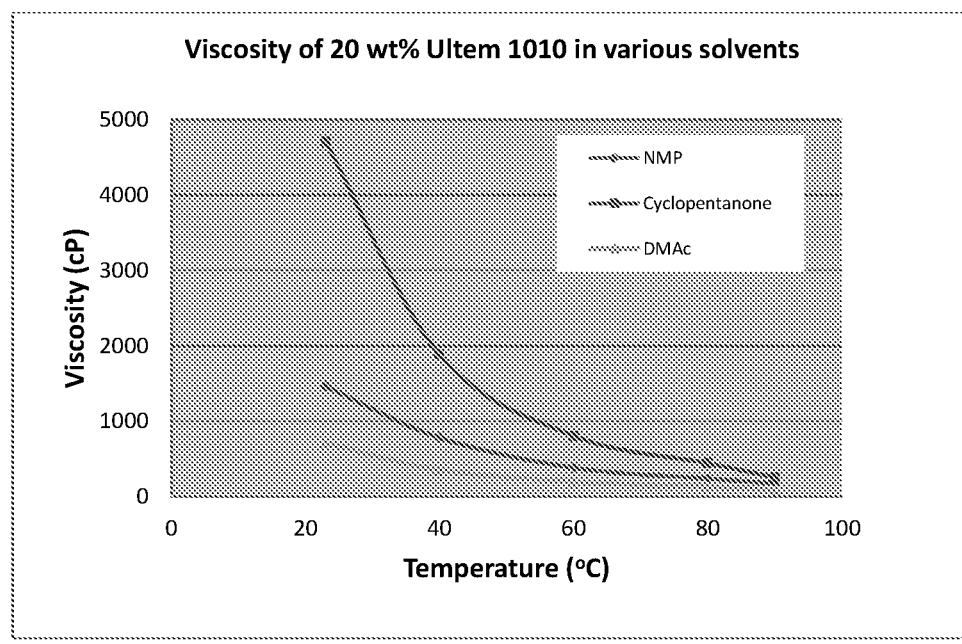
FIG. 2 shows the viscosity (cP) of a 20 wt % solution of a polyetherimide comprising structural units derived from phenylene diamine and BPA-dianhydride, and having a weight average molecular weight of 32,000 g/mole (ULTEM 1010) in NMP (circles), cyclopentanone (squares), and DMAc (triangles) from about 20 to about 90° C.
Figure 3:
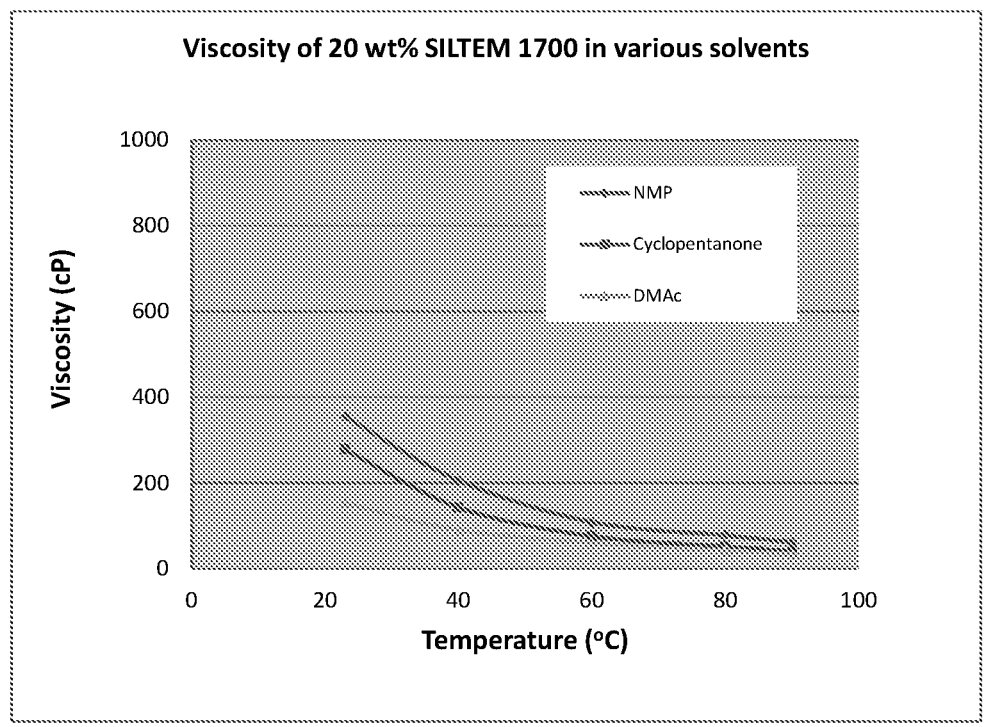
FIG. 3 shows the viscosity (cP) of a 20 wt % solution of a polyetherimide-dimethylsiloxane copolymer made from the imidization reaction of m-phenylene diamine, BPA-dianhydride and a bis-aminopropyl functional methyl silicone containing on average 10 silicone atoms, with a 20 wt % siloxane content and a Mn of 24,000 g/mole (SILTEM 1700) in NMP (circles), cyclopentanone (squares), and DMAc (triangles) from about 20 to about 90° C.
Figure 4:
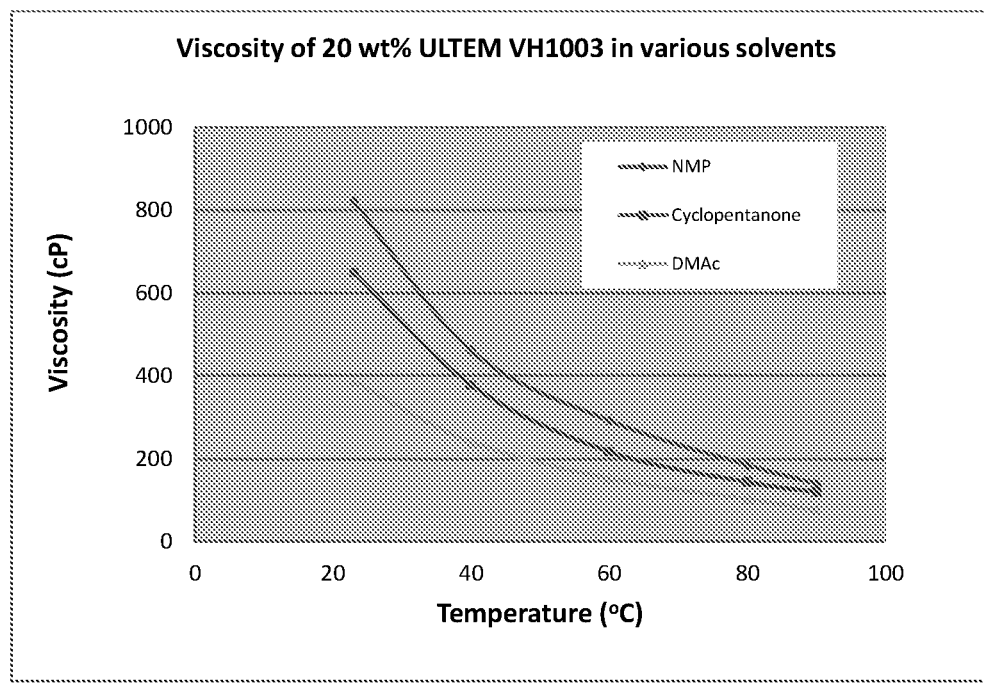
FIG. 4 shows the viscosity (cP) of a 20 wt % solution of a polyetherimide comprising structural units derived from diamino diphenyl sulfone and BPA-dianhydride, and having a weight average molecular weight of 20,000 g/mole (VH1003) in NMP (circles), cyclopentanone (squares), and DMAc (triangles) from about 20 to about 90° C.

Described herein is a varnish comprising an isolated, as-synthesized polyetherimide having a glass transition temperature of 180° C. or more, a solvent in an amount effective for the polyetherimide to remain in solution at a selected temperature, and optionally an inorganic particulate composition. The inventors hereof have discovered the use of a polyetherimide varnish provides a facile means of manufacturing compositions and articles for a variety of applications including laminates, adhesives, coatings, and composites.

The varnish comprises an isolated as-synthesized polyetherimide having a glass transition temperature (Tg) of 180° C. or more, for example 180 to 300° C. The term "isolated, as-synthesized polyetherimide" as used herein refers to polyetherimides that have been isolated after their manufacture. In other words, the varnishes are not a reaction mixture derived from the reactions used to synthesize the polyetherimides. In addition, the polyetherimides have not been further modified or functionalized following polymerization to increase solubility. An isolated, as-synthesized polyetherimide therefore has been isolated following polymerization, preferably further purified (e.g., by precipitation, crystallization, or the like) and no further modification, functionalization or chemical reaction has been carried out prior to its use in the varnish composition.

The polyetherimides comprise more than 1, for example 10 to 1000, or 10 to 500, structural units of formula (1)

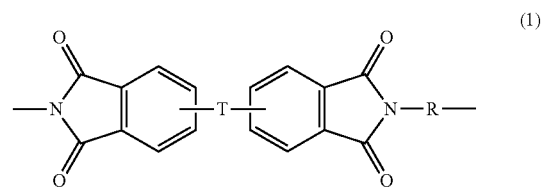

wherein each R is the same or different, and is a substituted or unsubstituted divalent organic group, such as a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof, in particular a divalent group of formula (2)

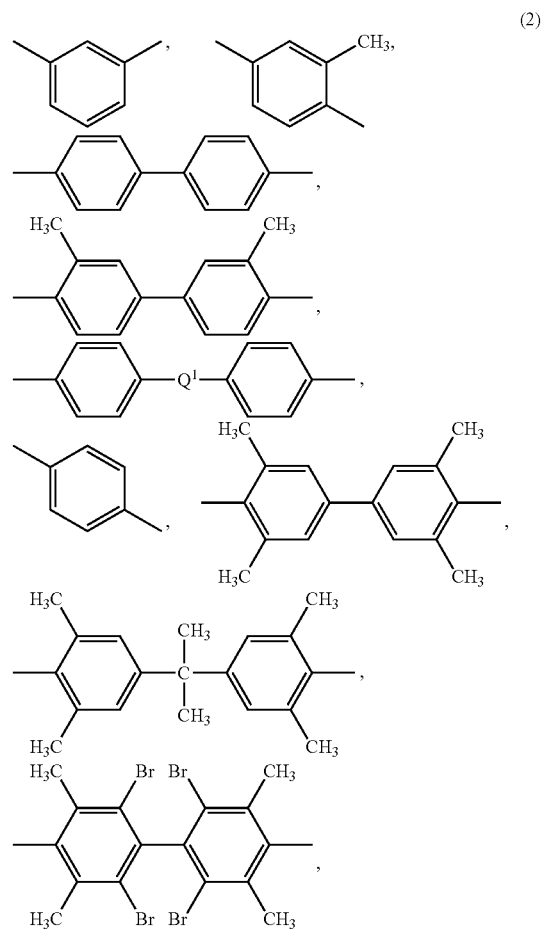

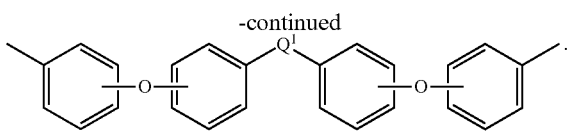

wherein $Q^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In an embodiment R is m-phenylene or p-phenylene.

Further in formula (1), T is —O— or a group of the formula —O—Z—O— wherein the divalent bonds of the —O— or the —O—Z—O— group are in the 3,3', 3,4', 4,3', or the 4,4' positions. The group Z in —O—Z—O— of formula (1) is also a substituted or unsubstituted divalent organic group, and can be an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded. Exemplary groups Z include groups derived from a dihydroxy compound of formula (3)

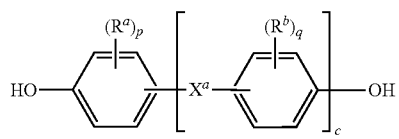

(3)

wherein R$^a$ and R$^b$ can be the same or different and are a halogen atom or a monovalent C$_{1-6}$ alkyl group, for example; p and q are each independently integers of 0 to 4; c is 0 to 4; and X$^a$ is a bridging group connecting the hydroxy-substituted aromatic groups, where the bridging group and the hydroxy substituent of each C$_6$ arylene group are disposed ortho, meta, or para (specifically para) to each other on the C$_6$ arylene group. The bridging group X$^a$ can be a single bond, —O—, —S—, —S(O)—, —SO$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of formula (3a)

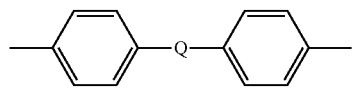

(3a)

wherein Q is —O—, —S—, —SO$_2$—, —SO—, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

The polyetherimide optionally comprises up to 10 mole percent (mol %), up to 5 mol %, or up to 2 mol % of units of formula (1) wherein T is a linker of the formulas

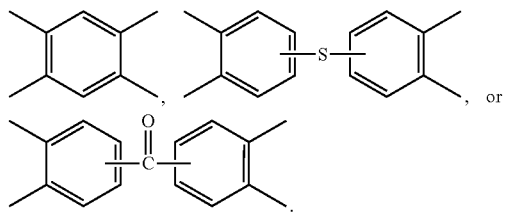

In some embodiments no units are present wherein R is of these formulas. In some embodiments, the polyetherimides have no R groups containing sulfone groups.

In an embodiment in formula (1), R is m-phenylene or p-phenylene and T is —O—Z—O— wherein Z is a divalent group of formula (3a). Alternatively, R is m-phenylene or p-phenylene and T is —O—Z—O— wherein Z is a divalent group of formula (3a) and Q is 2,2-isopropylidene.

In an embodiment, the polyetherimide can be a polyetherimide sulfone. For example, the polyetherimide can comprise the etherimide units wherein at least 10 mol %, for example 10 to 90 mol %, 10 to 80 mol %, 20 to 70 mol %, or 20 to 60 mol % of the R groups comprise a sulfone group. For example, R can be 4,4'-diphenylene sulfone, and Z can be 4,4'-diphenylene isopropylidene, providing units of the formula

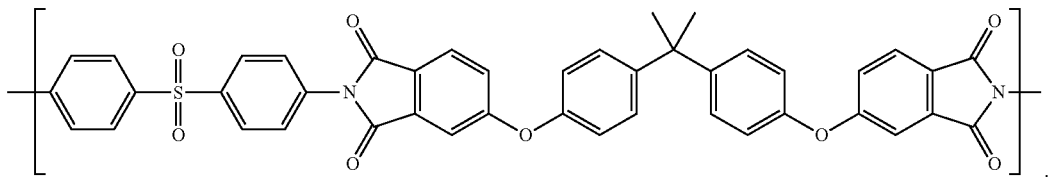

The polyetherimide can be prepared by any of the methods well known to those skilled in the art, including the reaction of an aromatic bis(ether anhydride) of formula (5)

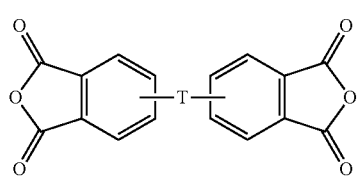

(5)

with an organic diamine of formula (6)

H$_2$N—R—NH$_2$ (6)

wherein T and R are defined as described above.

Illustrative examples of bis(anhydride)s include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; and, 4-(2,3-dicarboxyphenoxy)-4'-(3,4-dicarboxyphenoxy)diphenyl sulfone dianhydride, as well as various combinations thereof.

Examples of organic diamines include ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, and bis(4-aminophenyl) ether. Combinations of these compounds can also be used. In some embodiments the organic diamine is m-phenylenediamine, p-phenylenediamine, sulfonyl dianiline, or a combination comprising one or more of the foregoing.

The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide has a weight average molecular weight (Mw) of 1,000 to 150,000 grams/mole (Daltons), as measured by gel permeation chromatography, using polystyrene standards. In some embodiments the polyetherimide has an Mw of 10,000 to 80,000 Daltons. Such polyetherimides can have an intrinsic viscosity greater than 0.2 deciliters per gram (dl/g), or, more specifically, 0.35 to 0.7 dl/g as measured in m-cresol at 25° C.

The polyetherimide can also comprise a polyetherimide-siloxane copolymer comprising polyetherimide units of formula (1) and siloxane blocks of formula (7)

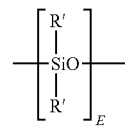

(7)

wherein each R' is independently a $C_{1-13}$ monovalent hydrocarbyl group. For example, each R' can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no halogens are present. Combinations of the foregoing R groups can be used in the same copolymer. In an embodiment, the polysiloxane blocks comprise R' groups that have minimal hydrocarbon content. In a specific embodiment, an R' group with a minimal hydrocarbon content is a methyl group.

The polyetherimide-siloxane can be a block or graft copolymer. Block polyetherimide-siloxane copolymers comprise etherimide units and siloxane blocks in the polymer backbone. The etherimide units and the siloxane blocks can be present in random order, as blocks (i.e., AABB), alternating (i.e., ABAB), or a combination thereof. Graft polyetherimide-siloxane copolymers are non-linear copolymers comprising the siloxane blocks connected to linear or branched polymer backbone comprising etherimide blocks.

The polyetherimide-siloxanes can be formed by polymerization of an aromatic bisanhydride (4) and a diamine component comprising an organic diamine (6) as described above or mixture of diamines, and a polysiloxane diamine of formula (8)

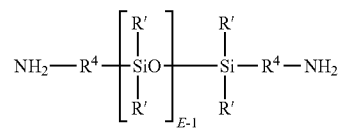

(8)

wherein R' and E are as described in formula (7), and $R^4$ is each independently a $C_2$-$C_{20}$ hydrocarbon, in particular a $C_2$-$C_{20}$ arylene, alkylene, or arylenealkylene group. In an embodiment $R^4$ is a $C_2$-$C_{20}$ alkyl group, specifically a $C_2$-$C_{20}$ alkyl group such as propylene, and E has an average value of 5 to 100, 5 to 75, 5 to 60, 5 to 15, or 15 to 40. Procedures for making the polysiloxane diamines of formula (8) are well known in the art.

In some polyetherimide-siloxanes, the diamine component can contain 10 to 90 mole percent (mol %), or 20 to 50 mol %, or 25 to 40 mol % of polysiloxane diamine (8) and 10 to 90 mol %, or 50 to 80 mol %, or 60 to 75 mol % of diamine (6). The diamine components can be physically mixed prior to reaction with the bisanhydride(s), thus forming a substantially random copolymer. Alternatively, block or alternating copolymers can be formed by selective reaction of (6) and (8) with aromatic bis(ether anhydride)s (5), to make polyimide blocks that are subsequently reacted together. Thus, the polyetherimide-siloxane copolymer can be a block, random, or graft copolymer.

In an embodiment, the polyetherimide-siloxane has units of formula (9)

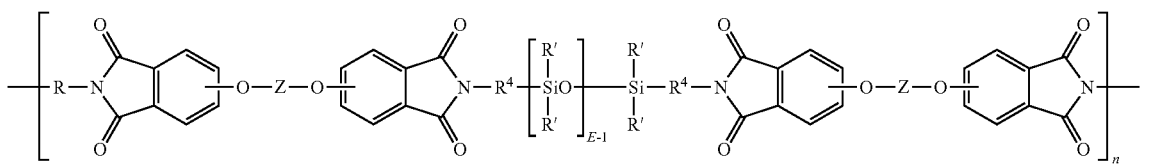

wherein R' and E of the siloxane are as in formula (5), the R and Z of the imide are as in formula (1), $R^4$ is the same as $R^4$ as in formula (8), and n is an integer from 5 to 100. In a specific embodiment, the R of the etherimide is a phenylene, Z is a residue of bisphenol A, $R^4$ is n-propylene, E is 2 to 50, 5, to 30, or 10 to 40, n is 5 to 100, and each R' of the siloxane is methyl.

The relative amount of polysiloxane units and etherimide units in the polyetherimide-siloxane depends on the desired properties, and are selected using the guidelines provided herein. In particular, as mentioned above, the block or graft polyetherimide-siloxane copolymer is selected to have a certain average value of E, and is selected and used in an amount effective to provide the desired weight percent of polysiloxane units in the composition. In an embodiment the polyetherimide-siloxane comprises 10 to 50 wt %, 10 to 40 wt %, or 20 to 35 wt % polysiloxane units, based on the total weight of the polyetherimide-siloxane.

The amount of polyetherimide present in the varnish can be 1 to 50 wt %, for example, 1 to 45 wt %, for example 5 to 45 wt %, for example, 10 to 40 wt %, wherein the amount of polyetherimide, solvent, and inorganic particulate composition total 100 wt %.

The varnish of the present disclosure further comprises a solvent. The solvent can be present in an amount effective for the polyetherimide to remain in solution at a selected temperature, for example, the solvent can be present in an amount of 15 to 99 wt %, wherein the amount of polyetherimide, solvent, and inorganic particulate composition total 100 wt %. The solvent can be a polar, electron donating solvent. In some embodiments, the solvent has a solubility parameter of 8.5 to 13. In some embodiments, the solvent has a boiling point greater than or equal to 90° C. For example, the solvent can include chlorobenzene, a dichlorobenzene, cresol, dimethyl acetamide, veratrole, pyridine, nitrobenzene, methyl benzoate, benzonitrile, acetophenone, n-butyl acetate, 2-ethoxyethanol, 2-n-butoxyethanol, dimethyl sulfoxide, anisole, cyclopentanone, gamma-butyrolactone, N,N-dimethyl formamide, N-methyl pyrrolidone, or a combination comprising at least one of the foregoing. In an embodiment, the solvent can be dimethyl acetamide (DMAc), cyclopentanone, N-methyl pyrrolidone (NMP), or a combination comprising at least one of the foregoing.

The varnish optionally comprises an inorganic particulate composition. The inorganic particulate composition can comprise one or more of a highly thermally conductive filler having a thermal conductivity of more than 45 W/mK, preferably aluminum nitride (AlN), aluminum carbide (AlC), aluminum oxide ($Al_2O_3$), boron nitride (BN), aluminum oxynitride (AlON), magnesium silicon nitride ($MgSiN_2$), silicon carbide (SiC), silicon nitride (Si3N4), graphite, expanded graphite, graphene, carbon fiber; a thermally conductive filler having a thermal conductivity of 10 to 45 W/mK, preferably zinc sulfide (ZnS), calcium oxide (CaO), magnesium oxide (MgO), zinc oxide (ZnO), titanium dioxide ($TiO_2$); a thermally insulating filler having a thermal conductivity of less than 10 W/mK, preferably talc ($H_2Mg_3(SiO_3)_4$), calcium carbonate ($CaCO_3$), magnesium hydroxide ($Mg(OH)_2$), mica, barium oxide (BaO), boehmite (AlO(OH)), gibbsite ($Al(OH)_3$), barium sulfate ($BaSO_4$), wollastonite (CaSiO3), zirconium oxide ($ZrO_2$), silica ($SiO_2$), glass beads, glass fibers, magnesium aluminate ($MgO.xAl_2O_3$), dolomite ($CaMg(CO_3)_2$), ceramic-coated graphite, clay; and a combination comprising at least one of the foregoing. Inorganic particulate compositions comprising boron nitride, aluminum oxide, graphite, and combinations comprising at least one of the foregoing can be especially useful.

The thermally conductive fillers can have, for example, an average particle size of 50 nanometers to 50 micrometers, and can be of any shape. The varnish comprising the polyetherimide and the inorganic particulate composition comprising a thermally conductive filler component can be mixed enough so that the average particle size of the thermally conductive filler particle is adequately reduced and a stable dispersion is formed. The thermally conductive filler component can be uniformly dispersed so that the average particle size of the filler in an organic solvent compatible with the polymer component (or the polymer component) is greater than 10, 20, 30, 40, or 50 nanometers to less than 1.0, 2.0, 3.0, 5.0, 10, or 20 micrometers. Generally speaking, filler component that is not adequately dispersed (e.g. a filler component that contains large agglomerates) can oftentimes degrade or defeat the functional aspects sought after in the materials.

When present, the inorganic particulate composition can be present in an amount of 0.5 to 40 wt %, for example 1 to 40 wt %, for example 5 to 30 wt %, wherein the amount of polyetherimide, solvent, and inorganic particulate composition total 100 wt %.

The varnish can have for example, a viscosity of greater than or equal to 100 centipoise (cP), for example 100 to 6,000 cP at 23° C. The varnish can have, for example, a viscosity of greater than or equal to 30 cP, for example, 30 to 250 cP at 90° C.

The varnish can optionally further comprise a thermosetting polymer composition. A thermosetting polymer composition can include, for example, an epoxy, a cyanate ester, a phenolic novolac epoxy, or a combination comprising at least one of the foregoing. When present, the thermosetting polymer composition can be present in an amount of 30 to 90 wt %, based on the weight of the polyetherimide. In an embodiment, a sample comprising the varnish comprising the thermosetting polymer composition can have at least one of improved flame retardance, improved toughness, and improved peel strength from copper after removing the solvent and curing the thermosetting composition, compared to a sample of the cured thermosetting composition alone.

In some embodiments, the above-described varnish can be disposed on a fibrous preform. A fibrous preform can include a woven or non-woven glass or carbon fabric. For example, a suitable fabric can comprise non-woven fabrics or woven fabrics comprising any of the following glass types: E, D, S, R, or a combination comprising at least one of the foregoing. Also suitable is NE type glass available from NittoBoseki Co., Fukushima, Japan. Suitable glass styles include, but are not limited to, 106, 1080, 2112, 2113, 2116, and 7628, wherein the term glass style is known to those skilled in the art and refers to the size of glass fibers and number of fibers in a bundle. In other embodiments fabrics can comprise such materials as aramid such as KEVLAR aramid available from DuPont, aramid/glass hybrid, or ceramic. In addition, woven fabrics of cellulose fibers can also be used. Fabrics can have a thickness from 5 to 200 micrometers, specifically 10 to 50 micrometers, and more specifically 10 to 40 micrometers. The fibrous preform can be coated or impregnated with the varnish.

The above described varnish can be manufactured by various methods according to general techniques which are known. For example, a method of manufacturing the varnish can include combining the components of the varnish, and heating the components with agitation or stirring at a temperature and for a period of time effective to dissolve the polyetherimide in the solvent, preferably at a temperature lower than the boiling point of the solvent.

The varnish can be used in the manufacture of articles useful for a wide variety of applications. An article can be manufactured from the varnish by, for example, forming the article from the varnish, for example by casting, molding, extruding, or the like, and removing the solvent from the formed article. Suitable articles can be in the form of a fiber, a layer, a conformal coating, a cast article, a prepreg, or a cured composite. In some embodiments, the article can be a layer, and can be formed by casting the varnish onto a substrate to form a cast layer. The solvent can be removed by any number of means, including by heating the cast layer, heating the cast layer under heat and pressure, for example by laminating the cast layer to another substrate. In some embodiments, articles prepared by the above-described methods can include adhesives, packaging material, capacitor films, or circuit board layers. In some embodiments, articles prepared from the polyetherimide varnish can be a polyetherimide dielectric layer, or a coating disposed on a substrate, for example a wire or cable coating. In a preferred embodiment, the article can be a polyetherimide dielectric layer in a circuit material, for example in a printed circuit board, used, for example, in lighting applications.

In some embodiments, the article can further comprise a fibrous preform, for example, a fibrous preform comprising any one or more of the above-described fabrics. When the article comprises a fibrous preform, the method of manufacturing the article can include forming the article from the varnish by coating or impregnating the preform with the varnish. The impregnated fibrous preform can optionally be shaped before or after removing the solvent.

In some embodiments, articles prepared from the varnish can comprise a thermosetting polymer composition, as discussed above. When the varnish comprises a thermosetting polymer composition, the method of manufacturing the articles from the varnish can further comprise partially curing the thermosetting polymer composition to form a prepreg, or fully curing the thermosetting polymer composition to form a composite article. The curing can be before or after removing the solvent from the varnish composition. In addition, the article can be further shaped before removal of the solvent or after removal of the solvent, before curing, after partial curing, or after full curing, for example by thermoforming. In an embodiment, the article is formed and the solvent is removed; the article is partially cured (B-staged); optionally shaped; and then further cured.

Exemplary articles prepared from the polyetherimide varnish for various applications can include copper clad laminates (CCL), for example, metal core copper clad laminates (MCCCL), composite articles, and coated articles, for example multilayer articles, as described below. Methods of manufacturing such articles represent another aspect of the disclosure.

In an exemplary embodiment, a polyetherimide dielectric layer prepared from the above-described varnish can be useful in a circuit assembly, for example, in a copper clad laminate. For example, a laminate can comprise a polyetherimide dielectric layer, a conductive metal circuit layer disposed on the polyetherimide dielectric layer, and optionally, a heat dissipating metal matrix layer disposed on the dielectric layer on a side opposite the conductive metal layer. In some embodiments, the polyetherimide dielectric layer can optionally comprise a fibrous preform (e.g., a fabric layer) and/or a thermosetting polymer composition. For example, the polyetherimide dielectric layer can further comprise a glass fabric layer or a cured thermoset polymer.

The conductive metal layer can be in the form of a circuit, and can be copper, zinc, brass, chrome, nickel, aluminum, stainless steel, iron, gold, silver, titanium, or an alloy containing one or more of these metals. Other useful metals include, but are not limited to, a copper molybdenum alloy, a nickel-cobalt iron alloy such as KOVAR, available from Carpenter Technology Corporation, a nickel-iron alloy such as INVAR, available from National Electronic Alloys, Inc., a bimetal, a trimetal, a trimetal derived from two-layers of copper and one layer of INVAR, and a trimetal derived from two layers of copper and one layer of molybdenum. In some embodiments suitable metal layers comprise copper or a copper-based alloy. Alternatively, wrought copper foils can be used. In a preferred embodiment, the conductive metal layer comprises copper and the laminate is a copper clad laminate.

Conductive metal layers in exemplary embodiments can have a thickness of 2 to 200 micrometers, specifically 5 to 50 micrometers, and more specifically 5 to 40 micrometers.

The heat dissipating metal matrix layer can be a thermally conductive metal such as aluminum, boron nitride, aluminum nitride, copper, iron, steel, or the like. A thermally conductive, electrically conductive metal can be used provided that the metal is electrically isolated from the metal circuit layer. Preferred supporting metal matrix layers can have a thickness of 0.1 to 20 millimeters, specifically 0.5 to 10 millimeters, and more specifically 0.8 to 2 millimeters. In a preferred embodiment, the metal matrix layer comprises aluminum.

Both the conductive metal layer and the supporting metal matrix layers can be pretreated to have high surface roughness for enhanced adhesion to the dielectric layer. In some cases, the dielectric layer can adhere firmly to the conductive metal layer or the heat dissipation layer without using an adhesive. In other embodiments, an adhesive can be used to improve adhesion of the dielectric layer to the conductive metal layer or the heat dissipation layer. Common adhesives used to bond the composite sheet to a metal (if an adhesive is used) are polyimide-based adhesives, acrylic-based adhesives, or epoxies.

The copper clad laminates can be made by thermal lamination of one or more dielectric layers, one or more conductive metal layers, and a supporting metal matrix layer, under pressure without using thermosetting adhesives. The dielectric layer can be prepared from the polyetherimide varnish, and can be prepared prior to the thermal lamination step by a solvent casting process to form a layer. In some embodiments, the polyetherimide dielectric layer, the conductive metal layer, and the thermal dissipation layer are thermally laminated together by an adhesive-free process under pressure to form a laminate. In an embodiment, a polyetherimide layer is placed between the electrically conductive metal layer and a layer of woven fabric, and thermally laminated under pressure in a single step. The electrically conductive metal layer can optionally be in the form of a circuit before laminating. Alternatively, the conductive metal layer can optionally be etched to form the electrical circuit following lamination. The laminating can be by hot press or roll calendaring methods, i.e., a roll-to-roll method.

Alternatively, laminates for a circuit assembly can be made by a solution casting method in which the polyetherimide varnish is cast directly onto the electrically conductive metal layer, followed by lamination to the heat dissipating metal matrix layer. Conversely, the polyetherimide solution can alternatively be cast directly onto the heat dissipating metal matrix layer, followed by lamination to the electrically conductive metal layer.

Figure 6:
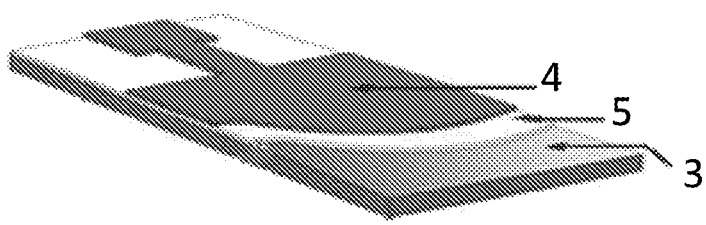
FIG. 6 shows a schematic representation of a copper clad laminate comprising a metal layer (e.g., aluminum) having an insulation layer (e.g., a polyetherimide layer) disposed on the metal layer, and a copper layer disposed on the insulation layer on a side opposite the metal layer.

In an embodiment, the copper clad laminate can be as shown in FIG. 6. FIG. 6 shows a copper clad laminate having a metal layer (3), for example, aluminum, a copper layer (4), and a dielectric layer (5) disposed between the metal layer and the copper layer.

Multilayer laminates comprising additional layers can also be made by thermal lamination in one step or in two or more consecutive steps by such processes as hot press or roll calendaring methods. In some embodiments seven layers or fewer can be present in the laminate and in other embodiments, sixteen layers or fewer. For example, in an exemplary embodiment a laminate can be formed in one step or in two or more consecutive steps with sequential layers of fabric-polyetherimide-metal-polyetherimide-fabric-polyetherimide-metal foil or a sub-combination thereof with fewer layers, such that the laminate comprises a layer of polyetherimide film between any layer of metal foil and any layer of fabric. In another embodiment a first laminate can be formed in one step or in two or more consecutive steps with a layer of fabric between two layers of polyetherimide, such as a layer of woven glass fabric between two layers of polyetherimide. A second laminate can then be prepared by laminating a metal foil to a polyetherimide side of the first laminate.

In a specific embodiment, the laminates can be prepared by a method comprising the steps of laminating the polyetherimide dielectric layer to the conductive metal circuit layer under heat, pressure, or a combination thereof, and optionally, subsequently, or simultaneously laminating the polyetherimide dielectric layer to the heat dissipating supporting metal matrix layer. The supporting metal matrix layer is disposed on the polyetherimide layer in a side opposite the conductive metal layer. The polyetherimide layer can be prepared by casting the above-described polyetherimide varnish onto a substrate, and removing solvent from the cast layer. Alternatively, the above-described varnish can be directly cast onto a conductive metal circuit layer, and the solvent can be removed to provide the polyetherimide dielectric layer.

In some embodiments, the polyetherimide layer can further comprise a woven or nonwoven glass fabric. When the polyetherimide layer further comprises a glass fabric, the polyetherimide layer can be prepared by impregnating the glass fabric with a polyetherimide varnish, and removing the solvent from the impregnated glass fabric.

In some embodiments, the polyetherimide layer can further comprise a thermosetting polymer, preferably an epoxy, a cyanate ester, a phenolic novolac epoxy, or a combination comprising at least one of the foregoing. When the polyetherimide dielectric layer further comprises a thermoset polymer, the thermoset polymer can be uncured or partially cured before laminating, and fully cured during or after the laminating. Alternatively, the thermosetting polymer can be fully cured prior to lamination. In some embodiments, the thermosetting polymer can be partially cured during and/or after solvent removal, or the thermosetting polymer can be fully cured during or after solvent removal. Following removal of the solvent and fully curing the thermosetting polymer, the resulting polyetherimide layer can have at least one of improved flame retardance, improved toughness, and improved peel strength from copper, compared to the thermosetting polymer alone.

The conductive metal layer in any of the above-described copper clad laminates can further be patterned to provide a printed circuit board. Furthermore, the copper clad laminates can be shaped to provide a circuit board having the shape of a sheet, a tube, or a rod. The copper clad laminates prepared by the above methods can have a thermal conductivity of greater than or equal to 0.3 W/m-K.

The printed circuit boards prepared by any of the above-described methods can have an overall thickness of 0.1 to 20 millimeters and specifically 0.5 to 10 millimeters, wherein overall thickness refers to an assembly comprising a layer each of the polyetherimide dielectric layer, the electrically conductive metal layer, and the supporting metal matrix layer. Circuit assemblies in some particular embodiments have an overall thickness of 0.5 to 2 millimeters and specifically 0.5 to 1.5 millimeters. There is no particular limitation on the thickness of the polyetherimide dielectric layer as long as a desired overall thickness of the laminate is achieved. In some embodiments the thickness of the polyetherimide dielectric layer is 5 to 1500 micrometers, specifically 5 to 750 micrometers, more specifically 10 to 150 micrometers, and even more specifically 10 to 100 micrometers.

Figure 5:
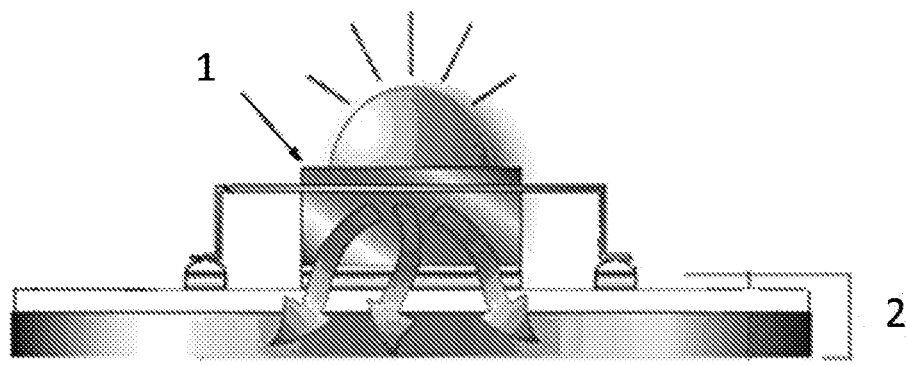
FIG. 5 shows a schematic depiction of a metal core printed circuit board (MCPCB) in a light emitting diode (LED) application.

In an embodiment, the printed circuit board can be a metal core printed circuit board (MCPCB) for use in a light emitting diode (LED) application, as depicted in FIG. 5, illustrating the MCPCB (2) and the LED component (1).

Articles comprising the circuit assemblies are another aspect of the disclosure. Articles include those comprising printed circuits as used in medical or aerospace industries. Still other articles include antennae and like articles. In other embodiments such articles include, but are not limited to, those comprising printed circuit boards, which are used, for example, in lighting, solar energy, displays, cameras, audio and video equipment, personal computers, mobile telephones, electronic notepads, and like devices, or office automation equipment. In other embodiments electrical parts can be mounted on printed circuit boards comprising a laminate.

In some embodiments, a method of manufacturing a composite article can comprise impregnating a porous base material with a polyetherimide varnish, optionally comprising the thermosetting polymer composition, and subsequently removing the solvent from the impregnated porous base material. As used herein, a "porous base material" can be any base material having any size pores or openings that may or may not be interconnected. Thus, a porous base material may be a fibrous preform or substrate as described above or other porous material comprising a ceramic, a polymer, a glass, carbon or a combination thereof. For example, the porous base material can be woven or non-woven glass fabric, a fiber glass fabric, or carbon fiber. The thermosetting polymer composition can be partially cured to form a prepreg, or can be fully cured to form a reinforced composite article. Removing the solvent from the impregnated porous base material can be achieved by heating, compressing, or heating and compressing the material. The impregnated porous base material can optionally be shaped before or after the partial curing step, and before or after the solvent removal step. The impregnated porous base material can also be shaped after curing, by thermoforming, for example.

The composite article prepared by the above-described method can be in the form of a fiber, a layer, a cast article, a prepreg, a wire coating, a molded article, a compression article, or a reinforced composite article.

In another specific embodiment, the varnish can be used as a coating, for example in the preparation of a multilayer article. A method of manufacturing the coating can comprise the steps of combining the varnish and a thermoplastic polymer, a thermosetting polymer, or a combination comprising at least one of the foregoing, and forming a coating on a substrate. In another embodiment, a multilayer article can be manufactured by forming a layer comprising the polyetherimide varnish, removing the solvent from the layer to provide a primer layer, forming a second layer comprising a ceramic, a thermoplastic polymer, a thermosetting polymer, or a combination comprising at least one of the foregoing on the primer layer to provide the multilayer article, and optionally thermally treating the multilayer article to cure the thermosetting polymer. The thermosetting polymer composition can be an epoxy, a cyanate ester, a phenolic novolac epoxy, or a combination comprising at least one of the foregoing. Removing the solvent from the primer layer can be by heating the layer, compressing the layer, or heating and compressing the layer. In some embodiments, the second layer can further comprise the polyetherimide varnish. When the second layer comprises the varnish, the method of manufacturing the multilayer article can further comprise the step of removing the solvent from the second layer using the above-described methods of removing the solvent in reference to the primer layer.

The ceramic can comprise $Al_2O_3$, $TiO_2$, $ZrO_2$, $Cr_2O_3$, $SiO_2$, MgO, BeO, $Y_2O_3$, $Al_2O_3$—$SiO_2$, MgO—$ZrO_2$, SiC, WC, $B_4C$, TiC, $Si_3N_4$, TiN, BN, AlN, TiB, $ZrB_2$, or a combination comprising at least one of the foregoing.

The thermoplastic polymer can be a fluoropolymer (e.g., polytetrafluoroethylene, tetrafluoroethylene-perfluoroalkyl-vinylether copolymers, tetrafluoroethylene-hexafluoropropylene copolymers, polychlorotrifluoroethylene, tetrafluoroethylene-ethylene copolymers, polyvinylidene fluoride, or a combination comprising at least one of the foregoing.

The thermosetting polymer composition can include an epoxy, a cyanate ester, phenolic novolac epoxy, or a combination comprising at least one of the foregoing.

The polyetherimide varnish provided herein is compatible with materials and manufacturing processes suited to various applications including circuit assemblies, laminates, coatings, and composite articles. Polyetherimide-containing layers provided by the varnish can be exceptionally useful in the manufacture of printed circuit boards used, for examples, in lighting applications.

The compositions, methods, and articles of the present disclosure are further illustrated by the following non-limiting examples.

EXAMPLES

Properties for various solvents for consideration in the preparation of the varnishes are shown in Table 1. The solubility parameter ("SP) values in Table 1 are Hansen solubility, calculated as follows.

$$\delta^2 = \delta d^2 + \delta p^2 + \delta h^2$$

where

δd is the energy from dispersion forces between molecules,

δp is the energy from dipolar intermolecular force between molecules, and

δh is the energy from hydrogen bonds between molecules.

Hansen, Charles (2007). Hansen Solubility Parameters: A user's handbook, Second Edition. Boca Raton, Fla.: CRC Press.

TABLE 1

| Solvent | CAS Registry No. | M.W. (g/mole) | B.P. (° C.) | log P (octanol-water) | SP value $(cal/cm^3)^{1/2}$ |
|---|---|---|---|---|---|
| n-Butyl acetate | 123-86-4 | 116.16 | 126.1 | 1.78 | 8.5 |
| 2-Ethoxyethanol (Ethyl cellosolve) | 110-80-5 | 90.12 | 135 | −0.32 | 11.5 |
| 2-n-Butoxyethanol (n-Butyl cellosolve) | 111-76-2 | 118.18 | 168.4 | 0.83 | 9.5 |
| DMSO (Dimethyl sulfoxide) | 67-68-5 | 78.13 | 189 | −1.35 | 12.9 |
| Anisole (Methyl Phenyl Ether) | 100-66-3 | 108.13 | 153.7 | 2.11 | 9.7 |
| Cyclopentanone | 120-92-3 | 84.12 | 130.5 | 0.63 | 10.4 |
| GBL (gamma-Butyrolactone) | 96-48-0 | 86.09 | 204 | −0.64 | 12.8 |
| NEP (N-Ethylpyrrolidone) | 2687-91-4 | 113.16 | 218 | −0.04 | |
| DMF (N,N-Dimethyl Formamide) | 68-12-2 | 73.09 | 153 | −1.01 | 11.5 |
| NMP (N-Methyl Pyrrolidone) | 872-50-4 | 99.13 | 202 | −0.38 | 11.2 |
| Chlorobenzene | 108-90-7 | 112.56 | 131 | 2.84 | |
| Dichlorobenzenes | 25321-22-6 | 148.01 | 179 | 3.28 | |
| Cresol | 1319-77-3 | 109.15 | 202 | 1.95 | |

TABLE 1-continued

| Solvent | CAS Registry No. | M.W. (g/mole) | B.P. (° C.) | log P (octanol-water) | SP value $(cal/cm^3)^{1/2}$ |
|---|---|---|---|---|---|
| DMAc (Dimethyl Acetamide) | 127-19-5 | 87.12 | 164 | −0.77 | |
| Veratrole (o-Dimethoxy Benzene) | 91-16-7 | 138.16 | 206 | 1.6 | |
| Pyridine (Azabenzene) | 110-86-1 | 79.1 | 115.2 | 0.65 | |
| NitroBenzene | 98-95-3 | 123.06 | 210.9 | 1.85 | |
| Methyl Benzoate | 93-58-3 | 136.15 | 199.6 | 2.12 | |
| Benzonitrile | 100-47-0 | 103.04 | 191.1 | 1.56 | |
| Acetophenone (1-Phenylethanone) | 98-86-2 | 120.15 | 202 | 1.58 | |

The materials shown in Table 2 were used in the examples.

TABLE 2

| Component | Description | Supplier |
|---|---|---|
| PEI-1 | Polyetherimide comprising structural units derived from phenylene diamine and BPA-dianhydride, and having a weight average molecular weight of 23,000 g/mole. | SABIC |
| PEI-2 | Polyetherimide comprising structural units derived from phenylene diamine and BPA-dianhydride, and having a weight average molecular weight of 32,000 g/mole. | SABIC |
| PEI-Si | Polyetherimide-dimethylsiloxane copolymer made from the imidization reaction of m-phenylene diamine, BPA-dianhydride and a bis-aminopropyl functional methyl silicone containing on average 10 silicone atoms, with a 20 wt % siloxane content and a Mn of 24,000 as measured by GPC. | SABIC |
| PEI-3 | Polyetherimide comprising structural units derived from diamino diphenyl sulfone and BPA-dianhydride, and having a weight average molecular weight of 20,000 g/mole. | SABIC |
| Boron nitride (BN)-1 | CAS No. 10043-11-5, hexagonal boron nitride, having an average particle size of 1 micrometers | Dandong Chemical Engineering Institute Co. |
| Boron nitride (BN)-2 | CAS No. 10043-11-5, hexagonal boron nitride, having an average particle size of 3 micrometers | Dandong Chemical Engineering Institute Co. |
| Aluminum oxide | CAS No. 1344-28-1, Aluminum oxide having an average particle size of 1 micrometer. | Shanghai Yurui Chemical Co., Ltd. |

Sample Testing

Physical measurements were made using the following tests and test methods, as described below. Unless indicated otherwise, test standards refer to those that were in effect in 2014.

Viscosity was measured by Brookfield Viscosity meter (DV-I Primo) at the indicated temperature General Procedure for Preparation of Laminates Laminates comprising the PEI-containing varnish were prepared according to the following general procedure. The varnish was cast on an alumina plate having a thickness of 0.8 to 1 millimeter to form a coating. The coated alumina plate was dried under heat or vacuum to remove the solvent from the coating. After drying, a copper foil was placed on the top of the dried organic layer. A metal core copper clad laminate was provided following heat lamination at a temperature of 280° C. for 2 hours (hr) using a hot pressure machine.

Through-plane thermal conductivity of the laminates was determined in accordance with ASTM E1461 using a laser flash method with a Nanoflash LFA 447 xenon flash apparatus from Netzsh Group. The test specimen was cut into a 10×10 millimeter square sample. Results from these measurements are provided in units of k (W/mK). Thermal conductivity k(T) is determined by thermal diffusivity, specific heat, and density of the specimen according to the equation as follows: $k(T)=\alpha(T)*c_p(T)*\rho(T)$, in which k(T) refers to thermal conductivity; $\alpha(T)$ refers to thermal diffusivity; $c_p(T)$ refers to specific heat, and $\rho(T)$ refers to density of the specimen. The thermal diffusivity ($\alpha(T)$, $cm^2/s$) can be determined by measurement of the temperature rise at the rear face of a thin-disc specimen produced by a short energy pulse on the front face.

The specific heat (Cp, J/gK), also called specific heat capacity, refers to the amount of energy required to raise one gram of a pure substance by one degree centigrade of the specific sample, and can be determined by differential scanning calorimetry (DSC). And the density ($\rho$, $g/cm^3$), is determined using a water immersion method (ASTM D792).

Example 1

For this example, 120 grams (g) of the indicated solvent was heated in a flask and maintained at 80° C. in oil bath. Thirty grams of the indicated polymer was added into the flask, and the mixture was stirred until the polymer dissolved. Dissolution time for powder materials) was generally about 1 hr, and about 8 to about 12 hr for pellets. After the polymer was dissolved, the heat source was removed and the mixture was left for 1-3 days, attaining a temperature of 23° C. Viscosity of each composition was measured at the indicated temperatures in Table 3. A plot of the data for each of the polymers is shown in FIGS. 1-4.

TABLE 3

| Solvent | Temperature (° C.) | Viscosity (cP) | | | |
| --- | --- | --- | --- | --- | --- |
| | | PEI-1 | PEI-2 | PEI-SI | PEI-3 |
| NMP | 23 | 568 | 1465 | 355 | 820 |
| | 40 | 302 | 783 | 206 | 461 |
| | 60 | 156 | 384 | 109 | 292 |
| | 80 | 98 | 241 | 78 | 185 |
| | 90 | 75 | 175 | 62 | 140 |
| Cyclopentanone | 23 | 523 | 4712 | 278 | 650 |
| | 40 | 265 | 1887 | 143 | 378 |
| | 60 | 121 | 807 | 76 | 217 |
| | 80 | 72 | 445 | 52 | 144 |
| | 90 | 58 | 256 | 41 | 120 |
| DMAc | 23 | 356 | 712 | 153 | 386 |
| | 40 | 187 | 354 | 90 | 240 |
| | 60 | 100 | 200 | 61 | 152 |
| | 80 | 60 | 134 | 43 | 103 |
| | 90 | 48 | 88 | 35 | 76 |

FIGS. 1-4 and the data in Table 3 show that the polyetherimides were able to form a solution (i.e., a varnish) in NMP, cyclopentanone, and DMAc. Higher working temperatures provided varnishes having lower viscosities. Molecular weight of the polyetherimide materials was also observed to affect varnish preparation. Lower molecular weight materials, for example, polyetherimide derived from phenylene diamine and bisphenol A-dianhydride having a weight average molecular weight of 23,000 grams per mole exhibited increased solubility in the various solvents compared to higher molecular weight materials, for example, polyetherimide derived from phenylene diamine and bisphenol A-dianhydride having a weight average molecular weight of 32,000 grams per mole. Enhanced solubility of the lower molecular weight materials yielded varnishes having lower viscosities at the tested temperatures.

Examples 2-4

Figure 7:
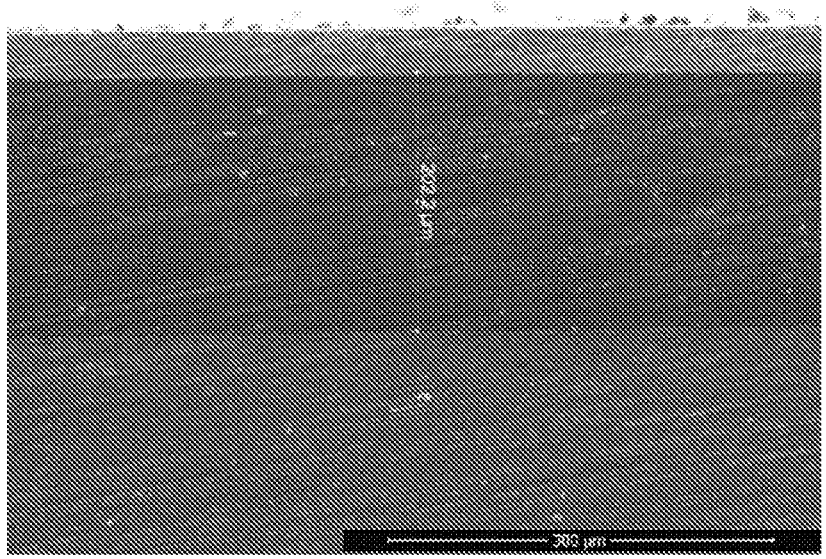
FIG. 7 shows a scanning electron microscope (SEM) image of a cross section of a metal core copper clad laminate including a polyetherimide layer having a thickness of 200 micrometers. Scale bar is 300 micrometers.
Figure 8:
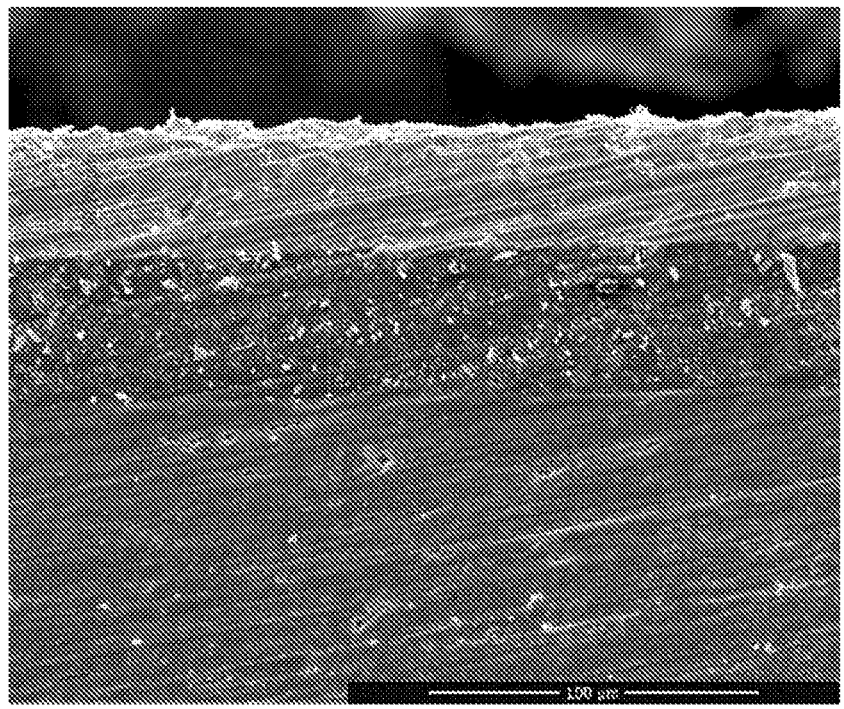
FIG. 8 shows a scanning electron microscope (SEM) image of a cross section of a metal core copper clad laminate including a polyetherimide layer having a thickness of 45 micrometers. Scale bar is 100 micrometers.

A metal core copper clad laminate was prepared from a varnish comprising a polyetherimide and dimethyl formamide (DMF). 80 grams of DMF was heated in a flask, and the temperature was maintained at 80° C. in an oil bath. 20 grams of PEI-1 was added, and the mixture was stirred until the polymer dissolved. Upon dissolution of the polymer, a varnish layer that is 25-250 micrometers thick was prepared by casting on a 0.8-1 mm thick alumina plate. Drying the varnish layer at 150° C. for 4 hr using a blast drying oven, followed by drying at 150° C. for 24 hr using a vacuum over provided the polyetherimide layer. Copper foil was disposed on the top of the polymer layer, followed by hot pressing under 20-40 bar of pressure at 280° C. for 2 hr provided a MCCCL. The polymer layer thickness for Examples 2, 3, and 4 were 200, 70, and 45 micrometers, respectively. Cross-sections of the MCCCLs of Examples 2 and 4 were imaged using scanning electron microscopy, as shown in FIGS. 7 and 8, respectively.

Examples 5-6

Figure 9:
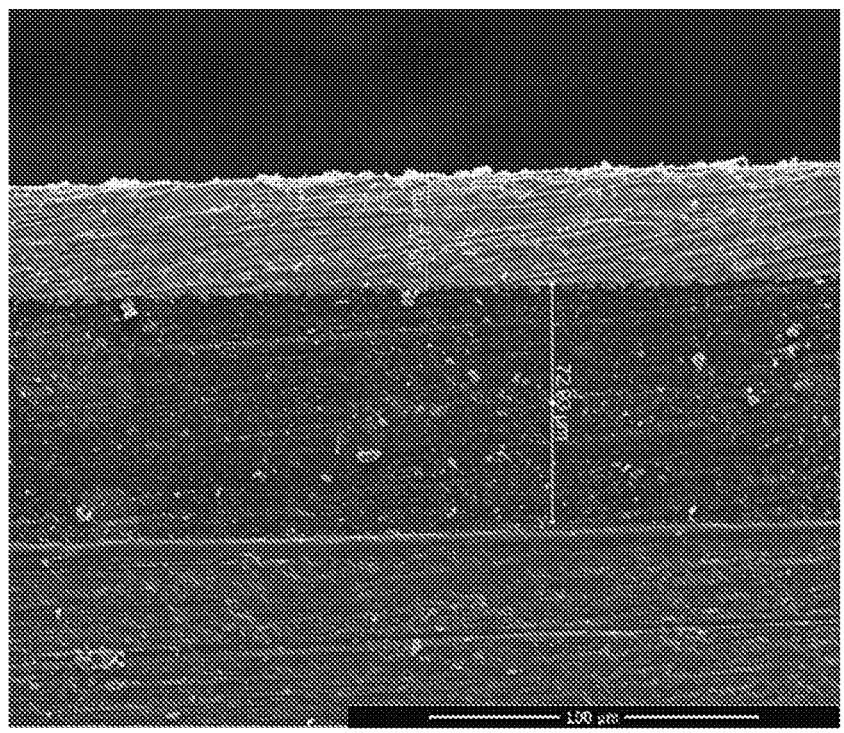
FIG. 9 shows a scanning electron microscope (SEM) image of a cross section of a metal core copper clad laminate including a polyetherimide layer comprising $Al_2O_3$ thermally conductive filler having a thickness of 73 micrometers. Scale bar is 100 micrometers.

Metal core copper clad laminates were prepared from a varnish comprising a polyetherimide and dimethyl formamide (DMF). 80 grams of DMF was heated in a flask, and the temperature was maintained at 80° C. in an oil bath. 14 grams of PEI-1 and 6 grams $Al_2O_3$ were added to the flask, and the mixture was stirred until the polymer dissolved. Upon dissolution of the polymer, a varnish layer that is 25-250 micrometers thick was provided by casting the varnish on a 0.8-1 mm thick alumina plate. Drying the varnish layer at 150° C. for 4 hr using a blast drying oven, followed by drying at 150° C. for 24 hr using a vacuum over provided the polyetherimide layer. Copper foil was disposed on the top of the polymer layer, followed by hot pressing under 20-40 bar of pressure at 280° C. for 2 hr provided a MCCCL. The polymer layer thickness for Examples 5 and 6 were 73 and 50 micrometers, respectively. A cross-section of the MCCCL of Example 5 was imaged using scanning electron microscopy, as shown in FIG. 9.

Examples 7-8

Figure 10:
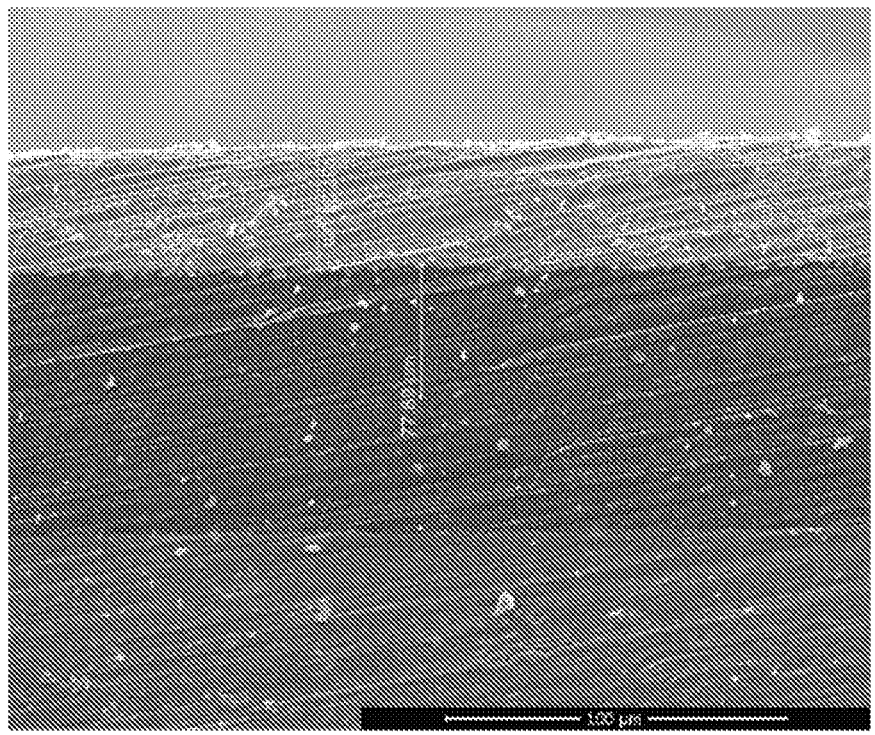
FIG. 10 shows a scanning electron microscope (SEM) image of a cross section of a metal core copper clad laminate including a polyetherimide layer comprising boron nitride thermally conductive filler having a thickness of 78 micrometers. Scale bar is 100 micrometers.
Figure 11:
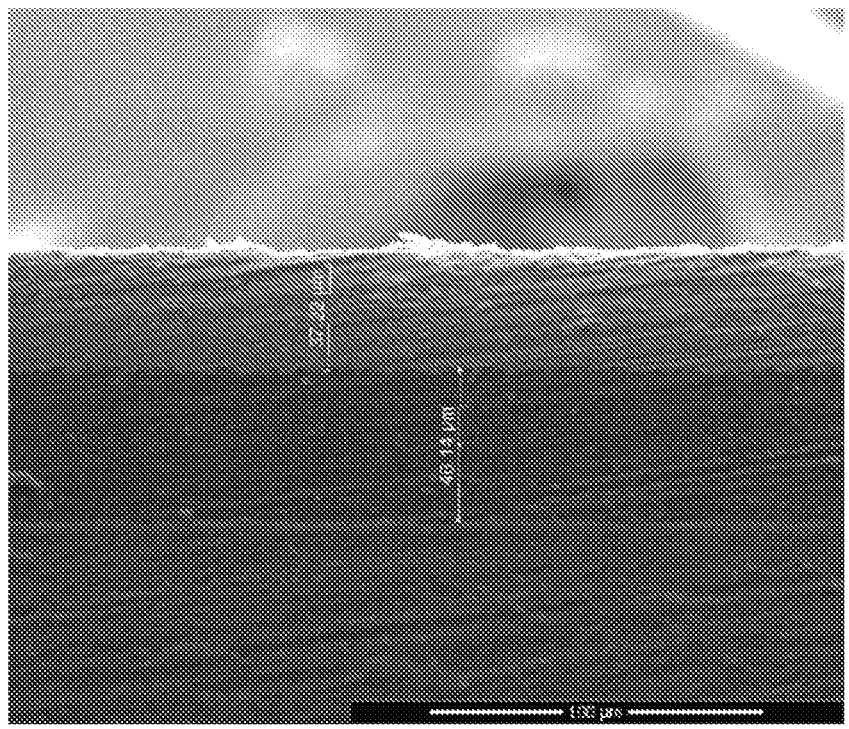
FIG. 11 shows a scanning electron microscope (SEM) image of a cross section of a metal core copper clad laminate including a polyetherimide layer comprising boron nitride thermally conductive filler having a thickness of 46 micrometers. Scale bar is 100 micrometers.

Metal core copper clad laminates were prepared from a varnish comprising a polyetherimide and dimethyl formamide (DMF). 65 grams of DMF was heated in a flask, and the temperature was maintained at 80° C. in an oil bath. 14 grams of PEI-1 and 6 grams BN-1 were added to the flask, and the mixture was stirred until the polymer dissolved. Upon dissolution of the polymer, a varnish layer that is 25-250 micrometers thick was provided by casting on a 0.8-1 mm thick alumina plate. Drying the varnish layer at 150° C. for 4 hr using a blast drying oven, followed by drying at 150° C. for 24 hr using a vacuum over provided the polyetherimide layer. Copper foil was disposed on the top of the polymer layer, followed by hot pressing under 20-40 bar of pressure at 280° C. for 2 hr provided a MCCCL. The polymer layer thickness for Examples 7 and 8 were 78 and 46 micrometers, respectively. Cross-sections of the MCCCLs of Examples 7 and 8 were imaged using scanning electron microscopy, as shown in FIGS. 10 and 11.

Example 9-10

Figure 12:
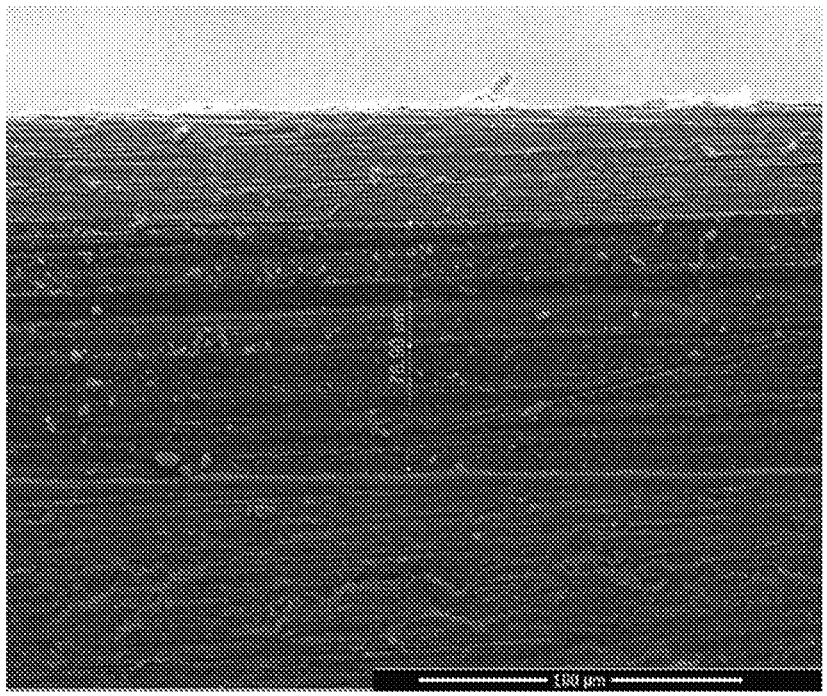
FIG. 12 shows a scanning electron microscope (SEM) image of a cross section of a metal core copper clad laminate including a polyetherimide layer comprising boron nitride thermally conductive filler having a thickness of 77 micrometers. Scale bar is 100 micrometers.
Figure 13:
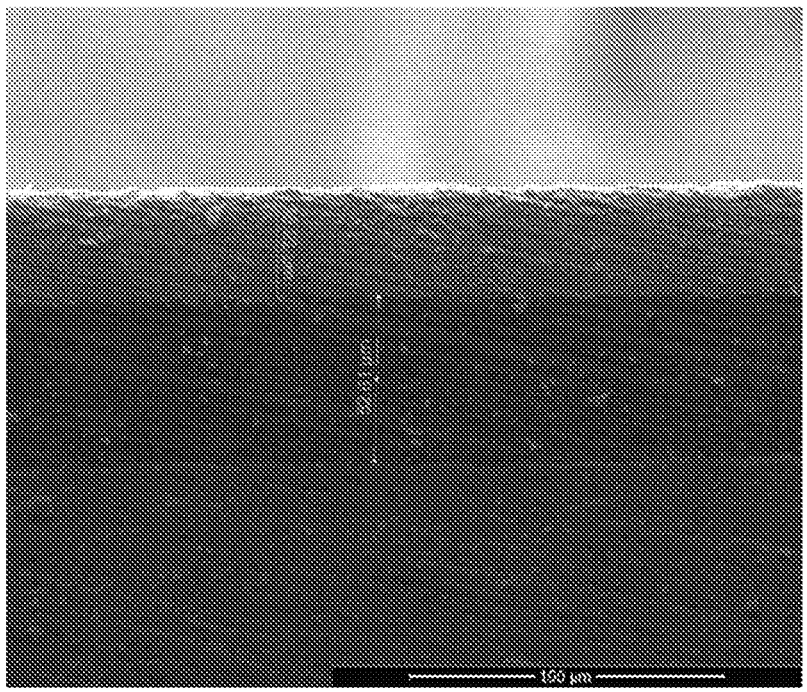
FIG. 13 shows a scanning electron microscope (SEM) image of a cross section of a metal core copper clad laminate including a polyetherimide layer comprising boron nitride thermally conductive filler having a thickness of 52 micrometers. Scale bar is 100 micrometers.

Metal core copper clad laminates were prepared by heating 65 grams of DMF heated in a flask, maintaining the temperature at 80° C. in an oil bath, adding 14 grams of PEI-1 and 6 grams BN-2 to the flask. The mixture was stirred until the polymer dissolved. Upon dissolution of the polymer, a varnish layer that is 25-250 micrometers thick was provided by casting on a 0.8-1 mm thick alumina plate. Drying the varnish layer at 150° C. for 4 hr using a blast drying oven, followed by drying at 150° C. for 24 hr using a vacuum over provided the polyetherimide layer. Copper foil was disposed on the top of the polymer layer, followed by hot pressing under 20-40 bar of pressure at 280° C. for 2 hr provided a MCCCL. The polymer layer thickness for Examples 9 and 10 were 75 and 52 micrometers, respectively. Cross-sections of the MCCCLs of Examples 9 and 10 were imaged using scanning electron microscopy, as shown in FIGS. 12 and 13.

The properties of the laminates of Examples 2-10 are summarized in Table 4.

TABLE 4

| Example | Polymer layer | Plate Thickness (mm) | PEI layer thickness (um) | Density (g/cm³) | Cp (J/g/K) | Diffusivity (mm²/s) | TC (W/(m*K)) |
|---|---|---|---|---|---|---|---|
| 2 | PEI | 1.047 | 200 | 2.573 | 1.409 | 0.868 | 3.146 |
| 3 | PEI | 0.908 | 70 | 2.728 | 1.192 | 4.107 | 13.354 |
| 4 | PEI | 0.884 | 45 | 2.843 | 1.374 | 4.094 | 15.999 |
| 5 | PEI-Al₂O₃ | 0.921 | 73 | 2.779 | 1.826 | 4.17 | 21.154 |
| 6 | PEI-Al₂O₃ | 0.9 | 50 | 2.813 | 1.763 | 7.556 | 37.466 |
| 7 | PEI-BN-1 | 0.905 | 78 | 2.782 | 1.962 | 6.37 | 34.765 |
| 8 | PEI-BN-1 | 0.904 | 46 | 2.668 | 1.901 | 9.412 | 47.734 |
| 9 | PEI-BN-2 | 0.938 | 77 | 2.595 | 2.147 | 5.628 | 31.362 |
| 10 | PEI-BN-2 | 0.915 | 52 | 2.734 | 1.962 | 6.809 | 36.52 |

Examples 2-4 illustrate that thinner polymer layers can provide greater thermal conductivities (TC). Examples 5-10 demonstrate that incorporating a thermally conductive filler, for example Al₂O₃ and BN, can further enhance the thermal conductivity relative to the examples not containing thermally conductive filler (Examples 2-4).

Prophetic Example 1

A FR-4 copper clad laminate (CCL) can be prepared from a varnish comprising a polyetherimide (PEI-1), boron nitride, epoxy, and dimethyl formamide (DMF). 50 g of DMF is heated in a flask, and the temperature is maintaining at 80° C. in an oil bath. 5 g of PEI-1 and 5 g of boron nitride are added into the flask and the mixture is stirred until the polymer dissolves. Upon dissolution, 38 g of bisphenol A diglycidyl ether that is preheated to 80° C. is added to the mixture. 1 g of dicyandiamide and 1 g of 2-ethyl-4-methylimidazole are added and mixed, forming the varnish. Prepregs are prepared by wetting an E-glass cloth with the varnish, followed by evaporating the solvent. Curing the prepregs is accomplished by heating at 140° C. for 1 to 5 minutes. Disposing copper foil on the top and the bottom of the prepreg, and laminating by hot pressing under 2 to 10 MPa of pressure at 200° C. for 2 hr can provide a FR-4 CCL.

Prophetic Example 2

Carbon fabric-containing composite materials are prepared from a varnish wherein 120 g of DMF is heated in a flask, and the temperature is maintained at 80° C. in an oil bath. 30 g of PEI-1 is added to the flask, and the mixture is stirred until the polymer dissolves. Upon dissolution of the polymer, a woven carbon fabric was impregnated with the varnish by immersing the fabric in the varnish for 1 to 5 minutes. Drying the impregnated carbon fabric at 120° C. for 4 hr in a blast drying oven, followed by laminating the carbon fabric under heat and pressure at 300 to 360° C. provides a carbon fabric-containing prepreg composite.

Prophetic Example 3

Glass fabric-containing composite materials are prepared from a varnish wherein 108 g of DMF is heated in a flask, and the temperature is maintained at 80° C. in an oil bath. 30 g of PEI-1 and 12 g of boron nitride is added to the flask, and the mixture is stirred until the polymer dissolves. Upon dissolution of the polymer, a glass fabric is immersed in the varnish for 1 to 5 minutes. The impregnated glass fabric is dried by heating at 120° C. for 4 hr in a blast drying oven, and is then cut so as to have a length of 10 to 20 millimeters in length. Glass fabric-containing composites can be obtained by injection molding or laminating under heat and pressure at 300 to 340° C.

Prophetic Example 4

This example describes the preparation of a coating material. 120 g of DMF is heated in a flask, and the temperature is maintained at 80° C. in an oil bath. 30 g of PEI-2 is added to the flask, and the mixture is stirred until the polymer dissolves. Upon dissolution of the polymer, the resulting varnish is cast onto a polytetrafluoroethylene (PTFE) plate so as to provide a coating layer having a thickness of 25 to 100 micrometers. Drying at 120° C. for 4 hr in a blast drying oven provides a coating over the PTFE substrate.

The polyetherimide varnish, articles prepared therefrom, and methods of manufacturing are further illustrated by the following embodiments, which are non-limiting.

Embodiment 1: A varnish comprising 1 to 45 wt % of an isolated as-synthesized polyetherimide having a glass transition temperature of 180° C. or more; a solvent in an amount effective for the polyetherimide to remain in solution at a selected temperature; and 0 to 40 wt % of an inorganic particulate composition wherein the amount of polyetherimide, inorganic particulate composition, and solvent total 100 wt %.

Embodiment 2: The varnish of embodiment 1, wherein the varnish has a viscosity greater than 100 cP at 23° C., or a viscosity greater than 30 cP at 90° C.

Embodiment 3: The varnish of any one or more of embodiments 1 to 2, wherein the polyetherimide comprises units of formula (1) wherein R is a $C_{2-20}$ hydrocarbon group, T is —O— or a group of the formula —O—Z—O— wherein the divalent bonds of the —O— or the —O—Z—O— group are in the 3,3', 3,4', 4,3', or the 4,4' positions, and Z is an aromatic $C_{6-24}$ monocyclic or polycyclic group optionally substituted with 1 to 6 $C_{1-8}$ alkyl groups, 1-8 halogen atoms, or a combination comprising at least one of the foregoing.

Embodiment 4: The varnish of embodiment 3, where R is a divalent group of formula (2) wherein in formula (2), $Q^1$ is —O—, —S—, —C(O)—, —SO₂—, —SO—, —$C_yH_{2y}$— and a halogenated derivative thereof wherein y is an integer from 1 to 5, or —$(C_6H_{10})_z$— wherein z is an integer from 1 to 4; and Z is a group derived from a dihydroxy compound of formula (3) wherein in formula (3), $R^a$ and $R^b$ are each independently a halogen atom or a monovalent $C_{1-6}$ alkyl group; p and q are each independently integers of 0 to 4; c is 0 to 4; and $X^a$ is a single bond, —O—, —S—, —S(O)—, —SO₂—, —C(O)—, or a $C_{1-18}$ organic bridging group.

Embodiment 5: The varnish of embodiment 4, wherein each R is independently meta-phenylene, para-phenylene, or a combination comprising at least one of the foregoing, and the Z is 4,4'-diphenylene isopropylidene.

Embodiment 6: The varnish of any one or more of embodiments 2 to 5, wherein the polyetherimide is a copolymer further comprising units of formula (9) wherein each R' is independently a $C_{1-13}$ monovalent hydrocarbyl group, each $R^4$ is a $C_2$-$C_{20}$ hydrocarbyl group, E of the siloxane is 2 to 50, 5, to 30, or 10 to 40, the R and Z of the imide are as in claim 3, and n is an integer from 5 to 100.

Embodiment 7: The varnish of any one or more of embodiments 2 to 5, wherein the polyetherimide comprises etherimide units wherein at least 10 mole percent of the R groups comprise a sulfone group, preferably wherein R is 4,4'-diphenylene sulfone and Z is 4,4'-diphenylene isopropylidene.

Embodiment 8: The varnish of any one or more of embodiments 1 to 7, wherein the solvent is a polar, electron donating solvent.

Embodiment 9: The varnish of any one or more of embodiments 1 to 8, wherein the solvent has a solubility parameter value of 8.5-13.

Embodiment 10: The varnish of any one or more of embodiments 1 to 9, wherein the solvent has a boiling point greater than 90° C.

Embodiment 11: The varnish of any one or more of embodiments 1 to 10, wherein the solvent is chlorobenzene, a dichlorobenzene, cresol, dimethyl acetamide, veratrole, pyridine, nitrobenzene, methyl benzoate, benzonitrile, acetophenone, n-butyl acetate, 2-ethoxyethanol, 2-n-butoxyethanol, dimethyl sulfoxide, anisole, cyclopentanone, gamma-butyrolactone, N,N-dimethyl formamide, N-methyl pyrrolidone, or a combination comprising at least one of the foregoing.

Embodiment 12: The varnish of any one or more of embodiments 1 to 11, comprising 0.5 to 40 wt % the inorganic particulate composition, wherein the inorganic particulate composition comprises one or more of a highly thermally conductive filler having a thermal conductivity of more than 45 W/mK, preferably aluminum nitride, aluminum carbide, aluminum oxide, boron nitride, aluminum oxynitride, magnesium silicon nitride, silicon carbide, silicon nitride, graphite, expanded graphite, graphene, carbon fiber; a thermally conductive filler having a thermal conductivity of 10 to 45 W/mK, preferably zinc sulfide, calcium oxide, magnesium oxide, zinc oxide), titanium dioxide; a thermally insulating filler having a thermal conductivity of less than 10 W/mK, preferably talc, calcium carbonate, magnesium hydroxide, mica, barium oxide, boehmite, gibbsite, barium sulfate, wollastonite, zirconium oxide, silica, glass beads, glass fibers, magnesium aluminate, dolomite, ceramic-coated graphite, clay; or a combination comprising at least one of the foregoing.

Embodiment 13: The varnish of any one or more of embodiments 1 to 12 comprising 5 to 45 wt %, preferably 10 to 40 wt %, more preferably 15 to 35 wt % of the polyetherimide; 1 to 40 wt %, preferably 5 to 30 wt % of the inorganic particulate filler, preferably a highly thermally conductive filler; wherein the solvent is a polar, electron donating solvent having a solubility parameter value of 8.5-13 and a boiling point greater than 90° C.

Embodiment 14: The varnish of any one or more of embodiments 1 to 13, further comprising a thermosetting polymer, preferably an epoxy, a cyanate ester, a phenolic novolac epoxy, or a combination comprising at least one of the foregoing.

Embodiment 15: The varnish of embodiment 14, comprising 30 to 90 wt % of the thermosetting polymer composition based on the weight of the polyetherimide.

Embodiment 16: The varnish any one or more of embodiments 14 to 15, wherein a sample comprising the varnish, after removing the solvent and curing the thermosetting composition, has at least one of improved flame retardance, improved toughness, and improved peel strength from copper, compared to a sample of the cured thermosetting composition alone.

Embodiment 17: The varnish of any one or more of embodiments 1 to 16 wherein the varnish is disposed on a fibrous preform, preferably a woven or non-woven, glass or carbon fabric, coated or impregnated with the varnish.

Embodiment 18: A method of manufacturing the varnish of any one or more of embodiments 1 to 17, the method comprising combining the components of the varnish; and heating the components at a temperature and for a period of time effective to dissolve the polyetherimide in the solvent, preferably at a temperature lower than the boiling point of the solvent.

Embodiment 19: A method of manufacturing an article from the varnish of any one or more of embodiments 1 to 17, the method comprising forming the article from the varnish; and removing the solvent from the formed article.

Embodiment 20: The method of embodiment 19, wherein the article is in the form of a fiber, a layer, a conformal coating, a cast article, a prepreg, or a cured composite article.

Embodiment 21: The method of embodiment 20, wherein the article is a layer, and the forming is by casting the varnish onto a substrate to form a cast layer; and the removing the solvent is by heating the cast layer, by heating the cast layer under heat and pressure, or by laminating the cast layer to another substrate.

Embodiment 22: The method of any one or more of embodiments 19 to 20, wherein the article further comprises a fibrous preform, and forming the article comprises coating or impregnating the preform with the varnish.

Embodiment 23: The method of any one or more of embodiments 19 to 22, wherein the article is an adhesive, a packaging material, a capacitor film, circuit board layer, or a reinforced composite article.

Embodiment 24: A method of preparing a copper clad laminate, the method comprising laminating the polyetherimide layer of embodiment 20 to a conductive metal circuit layer under heat, pressure, or a combination thereof; and optionally, subsequently or simultaneously, laminating the polyetherimide layer to a supporting metal matrix layer, wherein the supporting metal matrix layer is disposed on the polyetherimide layer on a side opposite the conductive metal circuit layer.

Embodiment 25: A method of preparing a metal core copper clad laminate, the method comprising laminating the polyetherimide layer of embodiment 20 to a supporting metal matrix under heat, pressure, or a combination thereof; and subsequently or simultaneously, laminating the polyetherimide layer to a conductive metal circuit layer, wherein the conductive metal circuit layer is disposed on the polyetherimide dielectric layer on a side opposite the supporting metal matrix layer.

Embodiment 26: The method of one or more of embodiments 24 to 25, wherein the polyetherimide layer is prepared by a method comprising casting the varnish of any one or more of embodiments 1 to 17 onto a substrate; and removing solvent from the cast layer.

Embodiment 27: A method of preparing a copper clad laminate, the method comprising casting the varnish of one or more of embodiments 1 to 17 onto a conductive metal circuit layer; removing the solvent to provide a polyetherimide dielectric layer; and optionally subsequently laminating the polyetherimide dielectric layer to a conductive metal circuit layer, wherein the conductive metal circuit layer is disposed on the polyetherimide dielectric layer on a side opposite the supporting metal matrix layer.

Embodiment 28: The method of any one or more of embodiments 24 to 27, wherein the supporting metal matrix layer comprises aluminum, copper, iron, or steel.

Embodiment 29: The method of any one or more of embodiments 24 to 28, wherein the polyetherimide layer further comprises a woven or nonwoven glass fabric.

Embodiment 30: The method of embodiment 29, wherein the polyetherimide layer is prepared by a method comprising impregnating the glass fabric with the varnish of any one or more of embodiments 1 to 13; and removing the solvent from the impregnated glass fabric.

Embodiment 31: A copper clad laminate prepared by the method of any one or more of embodiments 24 to 30.

Embodiment 32: The method of any one or more of embodiments 29 to 30, wherein the polyetherimide layer further comprises a thermosetting polymer, preferably an epoxy, a cyanate ester, a phenolic novolac epoxy, or a combination comprising at least one of the foregoing.

Embodiment 33: The method of any one or more of embodiments 29 to 30, wherein the thermosetting polymer is uncured or partially cured before the laminating.

Embodiment 34: The method of embodiment 33, wherein the thermosetting polymer is partially cured during the removing the solvent, after removing the solvent, or both.

Embodiment 35: The method of claim 33, further comprising fully curing the thermosetting polymer during the laminating or after the laminating or both.

Embodiment 36: The method of any one or more of embodiments 29 to 30, wherein the thermosetting polymer is fully cured before the laminating.

Embodiment 37: The method of embodiment 36, wherein the thermosetting polymer is fully cured during the removing the solvent, after the removing the solvent, or both.

Embodiment 38: The method of any one or more of embodiments 29 to 37, wherein after removing the solvent and fully curing the thermosetting polymer, the polyetherimide layer has at least one of improved flame retardance, improved toughness, and improved peel strength from copper, compared to the cured thermosetting polymer alone.

Embodiment 39: A thermoset copper clad laminate prepared by the method of any one or more of embodiments 32 to 38.

Embodiment 40: The method of any one or more of embodiments 24 to 39, further comprising patterning the conductive metal circuit layer to provide a printed circuit board.

Embodiment 41: The method of embodiment 40, further comprising shaping the metal core copper clad laminate wherein the printed circuit board is a metal core printed circuit board, and is in the shape of a sheet, tube, or rod.

Embodiment 42: A metal core copper clad laminate prepared by the method of any one or more of embodiments 24 to 41, wherein the laminate has a thermal conductivity of greater than 0.3 W/m-K.

Embodiment 43: The method of embodiments 40 to 41, wherein the printed circuit board is used in a LED lighting application or a solar energy application.

Embodiment 44: The method of embodiments 40 to 41, wherein the printed circuit board is used in a television, a mobile phone, or a laptop computer.

Embodiment 45: A method of manufacturing a composite, the method comprising impregnating a porous base material with the varnish of any one or more of embodiments 1 to 17; and removing the solvent from the impregnated porous base material.

Embodiment 46: The method of embodiment 45, wherein the removing the solvent is by heating, compressing, or heating and compressing.

Embodiment 47: The method of any one or more of embodiments 45 to 46, wherein the porous base material comprises a ceramic, a polymer, a glass, carbon, or a combination thereof.

Embodiment 48: A composite formed by the method of any one or more of embodiments 45 to 47, wherein the porous base material is a fibrous preform comprising woven or non-woven glass fabric, a fiberglass fabric, or a carbon fiber; and wherein the fibrous preform is coated or impregnated with the varnish.

Embodiment 49: An article comprising the composite of embodiment 48, wherein the article is a prepreg, a sheet, a fiber, a wire coating, a molded article, or a compression article.

Embodiment 50: A method of manufacturing a multilayer article, the method comprising forming a layer comprising the varnish of any one or more of embodiments 1 to 17 on a substrate; removing the solvent from the layer to provide a primer layer; forming a second layer comprising a ceramic, a thermoplastic polymer, a thermosetting polymer, or a combination comprising at least one of the foregoing on the primer layer to provide the multilayer article; and optionally thermally treating the multilayer article to cure the thermosetting polymer.

Embodiment 51: The method of embodiment 50, wherein the removing the solvent is by heating, compressing, or heating and compressing.

Embodiment 52: The method of embodiment 50 or 51, wherein the second layer further comprises the varnish of any one or more of embodiments 1 to 17, and forming the layer further comprises removing the solvent from the second layer.

Embodiment 53: The method of embodiment 52, wherein the removing the solvent of the second layer is by heating, compressing, or heating and compressing.

Embodiment 54: The method of any one or more of embodiments 50 to 53, wherein the ceramic is $Al_2O_3$, $TiO_2$, $ZrO_2$, $Cr_2O_3$, $SiO_2$, MgO, BeO; $Y_2O_3$, $Al_2O_3$—$SiO_2$, MgO—$ZrO_2$, SiC, WC, $B_4C$, TiC, $Si_3N_4$, TiN, BN, AlN, TiB, $ZrB_2$, or a combination comprising at least one of the foregoing.

Embodiment 55: The method of any one or more of embodiments 50 to 53, wherein the thermoplastic polymer is a fluoropolymer, more preferably polytetrafluoroethylene, tetrafluoroethylene-perfluoroalkylvinylether copolymer, tetrafluoroethylene-hexafluoropropylene copolymer, polychlorotrifluoroethylene, tetrafluoroethylene-ethylene copolymer, polyvinylidene fluoride, or a combination comprising at least one of the foregoing.

Embodiment 56: The method of any one or more of embodiments 50 to 53, wherein the thermosetting polymer composition is an epoxy, cyanate ester, phenolic novolac epoxy, or a combination comprising at least one of the foregoing.

In general, the compositions, methods, and articles can alternatively comprise, consist of, or consist essentially of, any appropriate components or steps herein disclosed. The compositions, methods, and articles can additionally, or alternatively, be formulated so as to be devoid, or substantially free, of any components, materials, ingredients, adjuvants or species used in the prior art compositions or that are otherwise not necessary to the achievement of the function and/or objectives of the present claims.

All ranges disclosed herein are inclusive of the endpoints, and the endpoints are independently combinable with each other. "Combination" is inclusive of blends, mixtures, alloys, reaction products, and the like. The terms "first," "second," and the like, do not denote any order, quantity, or importance, but rather are used to denote one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

The term "alkyl" includes branched or straight chain, unsaturated aliphatic $C_{1-30}$ hydrocarbon groups e.g., methyl, ethyl, n-propyl, i-propyl, n-butyl, s-butyl, t-butyl, n-pentyl, s-pentyl, n- and s-hexyl, n- and s-heptyl, and, n- and s-octyl. "Alkenyl" means a straight or branched chain, monovalent hydrocarbon group having at least one carbon-carbon double bond (e.g., ethenyl (—HC═CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$—, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, or P. "Substituted" means that the compound or group is substituted with at least one (e.g., 1, 2, 3, or 4) substituents independently selected from a $C_{1-9}$ alkoxy, a $C_{1-9}$ haloalkoxy, a nitro (—NO$_2$), a cyano (—CN), a $C_{1-6}$ alkyl sulfonyl (—S(═O)$_2$-alkyl), a $C_{6-12}$ aryl sulfonyl (—S(═O)$_2$-aryl) a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded.

All references are incorporated herein by reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A varnish comprising
   1 to 45 wt % of an isolated, as-synthesized polyetherimide having a glass transition temperature of 180° C. or more;
   a solvent in an amount effective for the polyetherimide to remain in solution at a selected temperature;
   0.5 to 40 wt % of an inorganic particulate composition, wherein the inorganic particulate composition comprises a thermally conductive filler having a thermal conductivity of more than 45 W/mK and an average particle size of greater than 10 nanometers to less than 20 micrometers;
   wherein the amount of polyetherimide, inorganic particulate composition, and solvent total 100 wt %; and
   wherein the varnish has
      a viscosity greater than 100 cP at 23° C., or
      a viscosity greater than 30 cP at 90° C.

2. The varnish of claim 1, wherein the solvent is a polar, electron donating solvent optionally having a solubility parameter value of 8.5-13, a boiling point greater than 90° C., or both.

3. The varnish of claim 1, wherein the inorganic particulate composition further comprises
   one or both of
   an additional thermally conductive filler having a thermal conductivity of 10 to 45 W/mK; and
   a thermally insulating filler having a thermal conductivity of less than 10 W/mK.

4. The varnish of claim 1 wherein the varnish is disposed on a fibrous preform.

5. The varnish of claim 1 comprising
   15 to 35 wt % of the isolated, as-synthesized polyetherimide having a glass transition temperature of 180° C. or more;
   5 to 30 wt % of the inorganic particulate composition wherein the amount of polyetherimide, inorganic particulate composition, and solvent total 100 wt %; and
   wherein the solvent is chlorobenzene, a dichlorobenzene, cresol, dimethyl acetamide, veratrole, pyridine, nitrobenzene, methyl benzoate, benzonitrile, acetophenone, n-butyl acetate, 2-ethoxyethanol, 2-n-butoxyethanol, dimethyl sulfoxide, anisole, cyclopentanone, gamma-butyrolactone, N,N-dimethyl formamide, N-methyl pyrrolidone, or a combination comprising at least one of the foregoing.

6. The varnish of claim 1, wherein the thermally conductive filler having a thermal conductivity of more than 45 W/mK and an average particle size of greater than 10 nanometers to less than 20 micrometers comprises boron nitride.

* * * * *